(12) United States Patent
Graham

(10) Patent No.: US 10,996,104 B2
(45) Date of Patent: May 4, 2021

(54) TERMINAL-IMAGING SEEKER USING A SPATIAL LIGHT MODULATOR BASED CODED-APERTURE MASK

(71) Applicant: Rosemount Aerospace Inc., Burnsville, MN (US)

(72) Inventor: Jason Graham, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 57 days.

(21) Appl. No.: 16/596,340

(22) Filed: Oct. 8, 2019

(65) Prior Publication Data

US 2020/0049550 A1 Feb. 13, 2020

Related U.S. Application Data

(63) Continuation-in-part of application No. 15/684,305, filed on Aug. 23, 2017, now Pat. No. 10,712,129.

(51) Int. Cl.

| | |
|---|---|
| *G01J 1/04* | (2006.01) |
| *G02B 13/14* | (2006.01) |
| *G02B 27/58* | (2006.01) |
| *F41G 7/22* | (2006.01) |
| *G01J 5/08* | (2006.01) |
| *F41G 7/00* | (2006.01) |

(52) U.S. Cl.
CPC ........... *G01J 1/0437* (2013.01); *G01J 1/0444* (2013.01); *G01J 1/0448* (2013.01)

(58) Field of Classification Search
CPC ....................................................... G01S 3/786
See application file for complete search history.

(56) References Cited

U.S. PATENT DOCUMENTS

| | | | | |
|---|---|---|---|---|
| 3,875,402 A | * | 4/1975 | Parkin ..................... | G01S 3/786 |
| | | | | 250/203 R |
| 4,131,248 A | * | 12/1978 | Berglund ............... | F41G 7/2246 |
| | | | | 244/3.16 |
| 4,183,664 A | * | 1/1980 | Rambauske .......... | F41G 7/2213 |
| | | | | 244/3.16 |

(Continued)

FOREIGN PATENT DOCUMENTS

| | | |
|---|---|---|
| EP | 3447545 A1 | 2/2019 |
| WO | 2013124664 A1 | 8/2013 |

OTHER PUBLICATIONS

Extended European Search Report dated Jul. 20, 2020, received for corresponding European Application No. 19216093.5, 10 pages.

(Continued)

*Primary Examiner* — Bernarr E Gregory
(74) *Attorney, Agent, or Firm* — Kinney & Lange, P.A.

(57) ABSTRACT

Apparatus and associated methods relate to creating corrected images of a scene for a terminal-imaging seeker using an electrically-controllable coded-aperture mask pattern embodied in a programmable spatial light modulator. The coded-aperture mask pattern includes a plurality of pinhole-like apertures, each of which is configured to perform pinhole-like lensing of the scene. The plurality of pinhole-like apertures form a multiplex of overlapping images on a focal plane array aligned with the optical axis. An image processor reconstructs, based on a configuration of the plurality of pinhole-like apertures and the multiplex of overlapping images, a single image of the scene.

20 Claims, 8 Drawing Sheets

(56) References Cited

U.S. PATENT DOCUMENTS

| | | | | |
|---|---|---|---|---|
| 4,690,512 | A * | 9/1987 | Forsyth | B29D 11/00009 156/310 |
| 5,737,075 | A * | 4/1998 | Koch | G01S 7/4816 342/179 |
| 5,784,156 | A * | 7/1998 | Nicholson | F41G 7/226 244/3.16 |
| 5,867,264 | A * | 2/1999 | Hinnrichs | G01J 3/04 356/310 |
| 7,626,150 | B2 * | 12/2009 | Chen | G02B 27/58 250/201.3 |
| 7,652,765 | B1 * | 1/2010 | Geshwind | G01J 3/2823 356/330 |
| 8,035,085 | B2 * | 10/2011 | Slinger | G01T 1/295 250/363.06 |
| 8,243,353 | B1 * | 8/2012 | Gutin | G03H 1/2286 359/21 |
| 8,354,626 | B2 * | 1/2013 | Eckhardt | F41G 7/2293 244/3.16 |
| 8,502,128 | B1 | 8/2013 | Streuber et al. | |
| 9,172,850 | B2 * | 10/2015 | Ludwig | H04N 3/12 |
| 9,983,063 | B1 * | 5/2018 | Tener | G01J 3/2823 |
| 10,712,129 | B2 * | 7/2020 | Ell | F41G 7/2246 |
| 2007/0165220 | A1 * | 7/2007 | Brady | G01J 3/02 356/310 |
| 2009/0090868 | A1 | 4/2009 | Payne | |
| 2012/0268574 | A1 * | 10/2012 | Gidon | H04N 13/218 348/49 |
| 2013/0208082 | A1 * | 8/2013 | Williams | H04N 5/23238 348/36 |
| 2014/0139630 | A1 * | 5/2014 | Kowalevicz | G02B 27/0961 348/46 |
| 2015/0139560 | A1 | 5/2015 | Deweert et al. | |
| 2017/0041571 | A1 * | 2/2017 | Tyrrell | H04N 5/37455 |

OTHER PUBLICATIONS

Todd A. Ell, Seeker with Software Defined Optics, May 15, 2017, 6 pages, UTC Aerospace Systems, Burnsville, MN.

Jing Chen, Yongtian Wang, and Hanxiao Wu, A Coded Aperture Compressive Imaging Array and Its Visual Detection and Tracking Algorithms for Surveillance Systems, Oct. 29, 2012, 19 pages, Key Laboratory of Photoelectronic Imaging Technology and System, Beijing, China.

M. Salman Asif, Ali Ayremlou, Aswin Sankaranarayanan, Ashok Veeraraghavan, and Richard Baraniuk, FlatCam: Thin, Bare-Sensor Cameras using Coded Aperture and Computation, Jan. 26, 2016, 12 pages, Rice University, Houston, TX and Carnegie Mellon University, Pittsburgh, PA.

Michael J. DeWeert and Brian P. Farm, Lensless coded-aperture imaging with seperable Doubly-Toeplitz masks, Feb. 2015, 10 pages, BAE Systems Spectral Solutions, Honolulu, HI.

Vivek Boominathan, Jesse K. Adams, M. Salman Asif, Benjamin W. Avants, Jacob T. Robinson, Richard G. Baraniuk, Aswin C. Sankaranarayanan, and Ashok Veeraraghavan, Lensless Imaging, A computational renaissance, IEEE Signal Processing Magazine, Sep. 2, 2016, 13 pages.

* cited by examiner

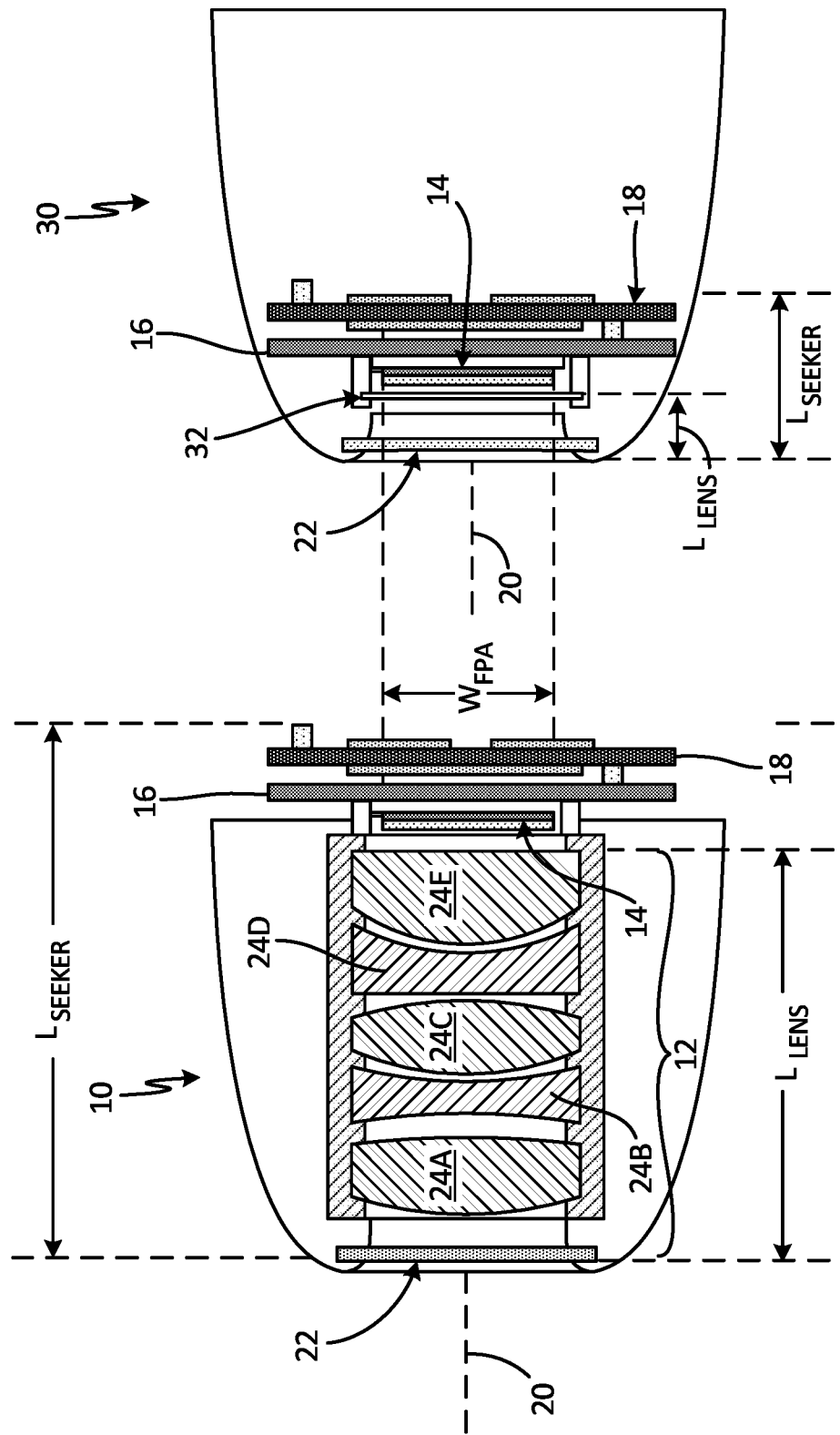

(FACE VIEW)

TERMINAL-IMAGING SEEKER USING A SPATIAL LIGHT MODULATOR BASED CODED-APERTURE MASK

CROSS-REFERENCE TO RELATED APPLICATION(S)

This application is a continuation in part of U.S. patent application Ser. No. 15/684,305 entitled "Thermal Imaging Seeker with Software Defined Optics," filed Aug. 23, 2017, which is now U.S. Pat. No. 10,712,129, and is hereby incorporated in its entirety by reference.

BACKGROUND

Precision guided munitions can use terminal-imaging seekers to improve weapon effectiveness. Munitions manufacturers are ever developing smaller and higher-shock-tolerant munitions. Therefore, smaller and higher-shock-tolerant terminal-imaging seekers are being sought. Many munitions have tapered nose cones so as to have a high ballistic coefficient. Terminal-imaging seekers are often located in these tapered nose cones. The terminal-imaging seekers must be able to survive the launch shocks of the munitions in which they are located. Terminal-imaging seekers include an imaging system that traditionally have a lens stack, which can be relatively heavy and big, thereby adding weight and size to the munitions for which they are designed. The available space in munitions for lenses is limited as the nose cones can be tapered for aerodynamic considerations. Furthermore, traditional lenses can be heavy and brittle which can make them have lower mechanical robustness in high shock environments such as in precision guided munitions. What are needed are systems and methods that reduce the size and/or weight of a terminal-imaging seeker.

SUMMARY

Apparatus and associated methods relate to a system for creating a corrected image of a scene for a terminal-imaging seeker. The system includes a lens, a focal plane array, a spatial light modulator, a controller, and an image processor. The lens is configured to receive light from a scene aligned with an optical axis. The focal plane array is aligned with the optical axis and has an imaging region comprising a plurality of light-sensitive pixels. The spatial light modulator is capable of generating a plurality of different coded-aperture mask patterns, each having a plurality of pinhole-like transparent aperutres. The spatial light modulator includes a plurality of electrically-controllable elements, each configured to modulate light transmission therethrough in response to an electrical control signal. The spatial light modulator is aligned along the optical axis so as to transmit light through the plurality of pinhole-like transparent apertures onto the imaging region of the focal plane array thereby forming a raw super-imposed image of a corresponding plurality of overlapping images of the scene. The controller is configured to generate a first electrical control signal that causes the spatial light modulator to generate a first of the plurality of coded-aperture mask patterns. The image processor is configured to create, based on an algorithm corresponding to the first of the plurality of coded-aperture mask pattern and on a first raw super-imposed image, the corrected image of the scene.

Some embodiments relate to a method for creating a corrected image of a scene for a terminal-imaging seeker. The method includes receiving, via a lens, light from a scene aligned along an optical axis. The method includes generating, via a controller, a first electrical control signal corresponding to a first of a plurality of coded-aperture mask patterns. The method includes generating, via a plurality of electrically-controllable elements of a spatial light modulator, the first of a plurality of coded-aperture mask pattern in response to the first electrical control signal generated by the controller. The first of a plurality of coded-aperture mask pattern has a plurality of pinhole-like transparent apertures. The method includes transmitting a portion of the light received by the lens through the plurality of pinhole-like apertures of the first of a plurality of coded-aperture mask pattern. The method includes projecting the portion of the light received by the lens and transmitted through the plurality of pinhole-like apertures onto a focal plane array aligned with the optical axis so as to form a first raw super-imposed image of a corresponding plurality of overlapping images of the scene. The method also includes creating, via an image processor, the corrected image of the scene based on an algorithm corresponding to the first of a plurality of coded-aperture mask pattern and on the first raw super-imposed image.

BRIEF DESCRIPTION OF THE DRAWINGS

FIGS. 1A-1B are cross-sectional views of two different systems for creating images of a scene for a terminal-imaging seeker.

DETAILED DESCRIPTION

Figure 2A:
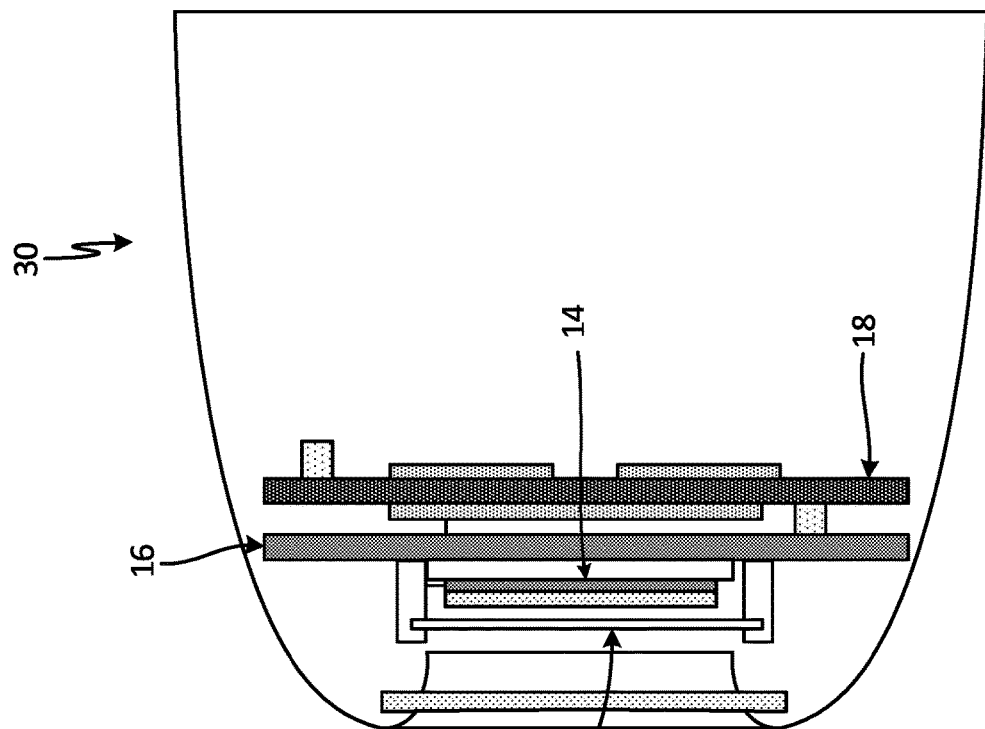
FIGS. 2A-2C are schematic views of an imaging system for a terminal-imaging seeker depicting a juxtaposition of a spatial light modulator and a focal plane array.

Apparatus and associated methods relate to creating corrected images of a scene for a terminal-imaging seeker using an electrically-controllable coded-aperture mask pattern. The coded-aperture mask pattern includes a plurality of pinhole-like apertures—pinhole-like transparent regions or apertures, which can be surrounded by opaque or reflective regions, each of which is configured to perform pinhole-like lensing of the scene. The plurality of pinhole-like apertures form a multiplex of overlapping images on a focal plane array aligned with the optical axis. An image processor reconstructs, based on a configuration of the plurality of pinhole-like apertures and the multiplex of overlapping images, a single image of the scene.

FIGS. 1A-1B are cross-sectional views of two different systems for creating images of a scene for a terminal-imaging seeker. In FIG. 1A, prior art terminal-imaging seeker 10 includes lens stack 12, focal plane array 14, imaging board 16, and video processing card 18, each aligned along optical axis 20. In the depicted embodiment, lens stack 12 includes blunt faceplate 22, and a plurality of lenses 24A-24E. Optical lens stack 12 is configured to receive light from a scene aligned along optical axis 20 and to focus the received light onto focal plane array 14, thereby forming an image of the aligned scene. The formed image includes pixel data generated by the plurality of pixels. Imaging board 16 receives the pixel data generated by focal plane array 14 and performs image processing operations using the received pixel data. The depicted embodiment has video processing card 18, which receives each of the processed images, and then outputs each received image in a video stream and/or a targeting vector for the munition to seeker 10 belongs.

In the embodiment depicted in FIG. 1A, the lens stack or optical assembly is the most volumetric element of terminal-imaging seeker 10. Axial length $L_{SEEKER}$ of terminal-imaging seeker 10 includes axial length $L_{OPTICS}$ of lens stack 12 and axial length $L_{ELEC}$ of the electronics, which include focal plane array 14, imaging board 16, and video processing card 18. In the depicted embodiment, axial length $L_{OPTICS}$ of lens stack 12 is typically greater than 50% of axial length $L_{SEEKER}$ of terminal-imaging seeker 10. Axial length $L_{OPTICS}$ of lens stack 12 is also greater than a lateral width $W_{FPA}$ of focal plane array 16.

In FIG. 1B, terminal-imaging seeker 30 includes blunt window faceplate 22, focal plane array 14, imaging board 16, and video processing card 18, but instead of lens stack 12, terminal-imaging seeker 30 includes spatial light modulator 32 functioning as a spatial light modulator. Comparing FIGS. 1A and 1B to one another, a stark difference in axial length $L_{SEEKER}$ is discernable. Although axial length $L_{ELEC}$ of the electronics remains the same, in the FIG. 1B embodiment, axial length $L_{OPTICS}$ of terminal-imaging seeker 30 is less than lateral width $W_{FPA}$ of focal plane array 16. By replacing lens stack 12 with spatial light modulator 32, a dramatic decrease in system volume can be achieved. Such a replacement can be made if terminal-imaging seeker 30 can create images of the scene aligned along optical axis 20 that have sufficient quality for use in target detection.

Such sufficient quality imaging can be obtained using spatial light modulator 32 functioning as a spatial light modulator. Spatial light modulators extend the concept of a pinhole camera. Spatial light modulators have a plurality of pinhole-like apertures—pinhole-like transparent regions, each of which can be surrounded by opaque or reflective regions or separated from one another by intervening opaque or reflective regions. Each of these pinhole-like apertures is configured to facilitate generation of an image of the scene aligned along the optical axis. Each of these images of the scene is overlapping but shifted in space. The result of this plurality of pinhole-like apertures is a raw super-imposed image that includes a multiplex of overlapping images. A single image of the scene can be reconstructed from the multiplex of overlapping images using one of a variety of reconstruction algorithms. Each reconstruction algorithm corresponds to a specific configuration of the plurality of pinhole-like apertures. Various configurations of the plurality of pinhole-like apertures lend themselves to various corresponding algorithms. Some specific configurations of the pinhole-like apertures correspond to reconstruction algorithms that are less process intensive than other reconstruction algorithms for other specific configurations of pinhole-like apertures. For example, configurations known as separable doubly-Toeplitz configurations can have reconstruction algorithms that are relatively efficient, even for images formed by a large number of pixels.

Spatial light modulator 32 is configured to generate a plurality of different coded-aperture mask patterns, each having a plurality of pinhole-like transparent regions separated from one another by intervening opaque and/or reflective regions. Spatial light modulator 32 has a plurality of electrically-controllable elements, each configured to modulate light transmission therethrough in response to an electrical control signal. Spatial light modulator 32 can be aligned along the optical axis so as to transmit light through the plurality of pinhole-like transparent regions onto the imaging region of focal plane array 14 thereby forming a raw super-imposed image of a corresponding plurality of overlapping images of the scene.

In some embodiments, spatial light modulator can have a plurality of liquid-crystal elements. For example, in some embodiments, spatial light modulator 32 includes two layers of liquid-crystal elements. A first layer can be configured to controllably modulate light transmission in parallel lines perpendicular to the optical axis. A second layer can be configured to controllably modulate light transmission in parallel lines perpendicular to both the optical axis and the parallel lines of the first layer. Such first and second layer alignment can be done so as to align the parallel lines with the pixels of focal plane array 14. In other embodiments, spatial light modulator 32 can include a two-dimensional array of liquid-crystal pixel elements, the two-dimensional array being perpendicular to the optical axis. Again, alignment of the two-dimensional array can be done so as to be aligned with the pixels of focal plane array 14.

These and other configurations of such liquid-crystal elements can be used to generate various configurations of coded-aperture mask patterns, such as, for example, Uniformly Redundant Array (URA), Modified Uniformly Redundant Array (MURA), Maximum Length Sequence (MLS), and Doubly Toeplitz mask patterns.

Spatial light modulator 32 can generate a variety of coded-aperture mask patterns in response to a corresponding variety of control signals. Such capability of generating different coded-aperture mask patterns can be used for various purposes. For example, multiple images obtained by focal plane array 14 corresponding to multiple different coded-aperture mask patterns can be used to obtain a corrected image of the scene having fewer aberrations than a corrected image using just one coded-aperture mask pattern. More benefits of such spatial light modulator capability will be further explored below.

Because a spatial light modulator performs the function of a lens, no additional non-optically neutral lens is needed in the system. Because the FIG. 1B embodiment uses spatial light modulator 32 functioning as a spatial light modulator instead of using a lens stack, the FIG. 1B embodiment can be called a reduced-height design. Because a non-optically neutral lens is not need an optically-neutral lens or window can be used to protect transmit light from the field of view while providing protection for the seeker. The simplest optically neutral lens is simply a flat plate of glass. Such a flat plate of glass can be a viable alternative design when aerodynamic loading is not an issue.

Figure 2B:
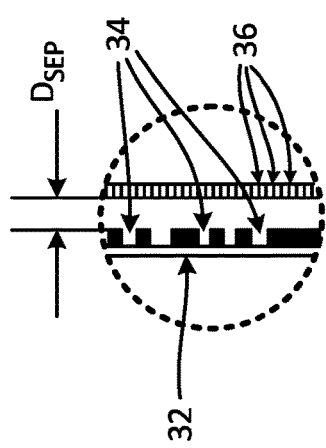
Figure 2C:
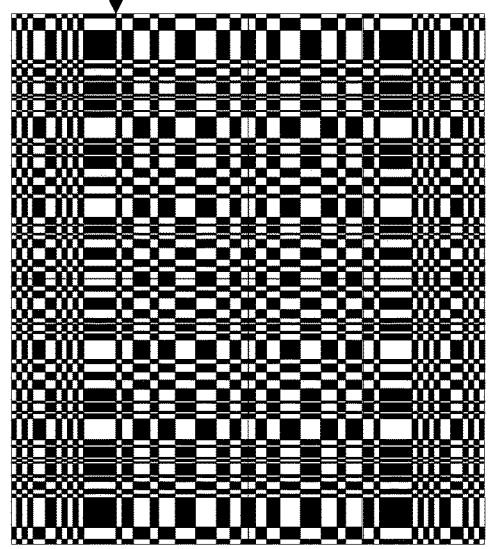

FIGS. 2A-2C are schematic views of an imaging system for a terminal-imaging seeker depicting a juxtaposition of a spatial light modulator and a focal plane array. In FIG. 2A, terminal-imaging seeker 30 (depicted in FIG. 1B) is reproduced for the purpose of illustrating configurations and details of spatial light modulator 32 and focal plane array 14.

In FIG. 2B, sections of spatial light modulator 32 and focal plane array 14 are shown in cross-sectional magnification. Individual apertures 34 of spatial light modulator 32 are shown. Also shown are individual pixels 36 of focal plane array 14. Spatial light modulator 32 and focal plane array 14 are axially separated one from another by axial separation distance $D_{SEP}$. Axial separation distance $D_{SEP}$, as depicted in FIG. 2B, is the axial distance between a rear surface of spatial light modulator 32 and a front surface of focal plane array 14.

As indicated in the depicted embodiment, axial separation distance $D_{SEP}$ is relatively small, with respect to many other dimensions of terminal-imaging seeker 30. For example, axial separation distance $D_{SEP}$ can be 200 microns or less. In some embodiments, axial separation distance $D_{SEP}$ is less than 100 times a lateral width dimension of each of pixels 36. Note also the dimensions of a lateral width dimension of individual apertures 34. Such lateral width dimensions can vary between individual apertures 34. In some embodiments, the lateral width dimension of each individual aperture 34 is an integral multiple of a minimum lateral width dimension. The minimum lateral width dimension can be less than three times the lateral width dimension of a lateral width dimension of a pixel, for example.

In FIG. 2C, an axial plan view of spatial light modulator 32 is shown. Spatial light modulator 32 has been configured to operate as a coded aperture plate in response to a control signal. The coded aperture plate operates as a mask that includes a plurality of apertures 34 of various sizes and aspect ratios. Each of the plurality of apertures 34 can be used, in pinhole camera fashion, to form an image upon focal plane array 14. By forming a multiplex of pinhole camera-like images, signal strength can be increased over a single pinhole-camera-like image. The signal strength increase comes at the expense of forming a multiplex of overlapping images, from which a single image can be formed using a reconstruction algorithm. Such a reconstruction algorithm can be performed using digital post processing, for example. The reconstruction algorithm selected depends on the configuration of the plurality of pinhole-like apertures 34 of spatial light modulator 32.

Figure 3:
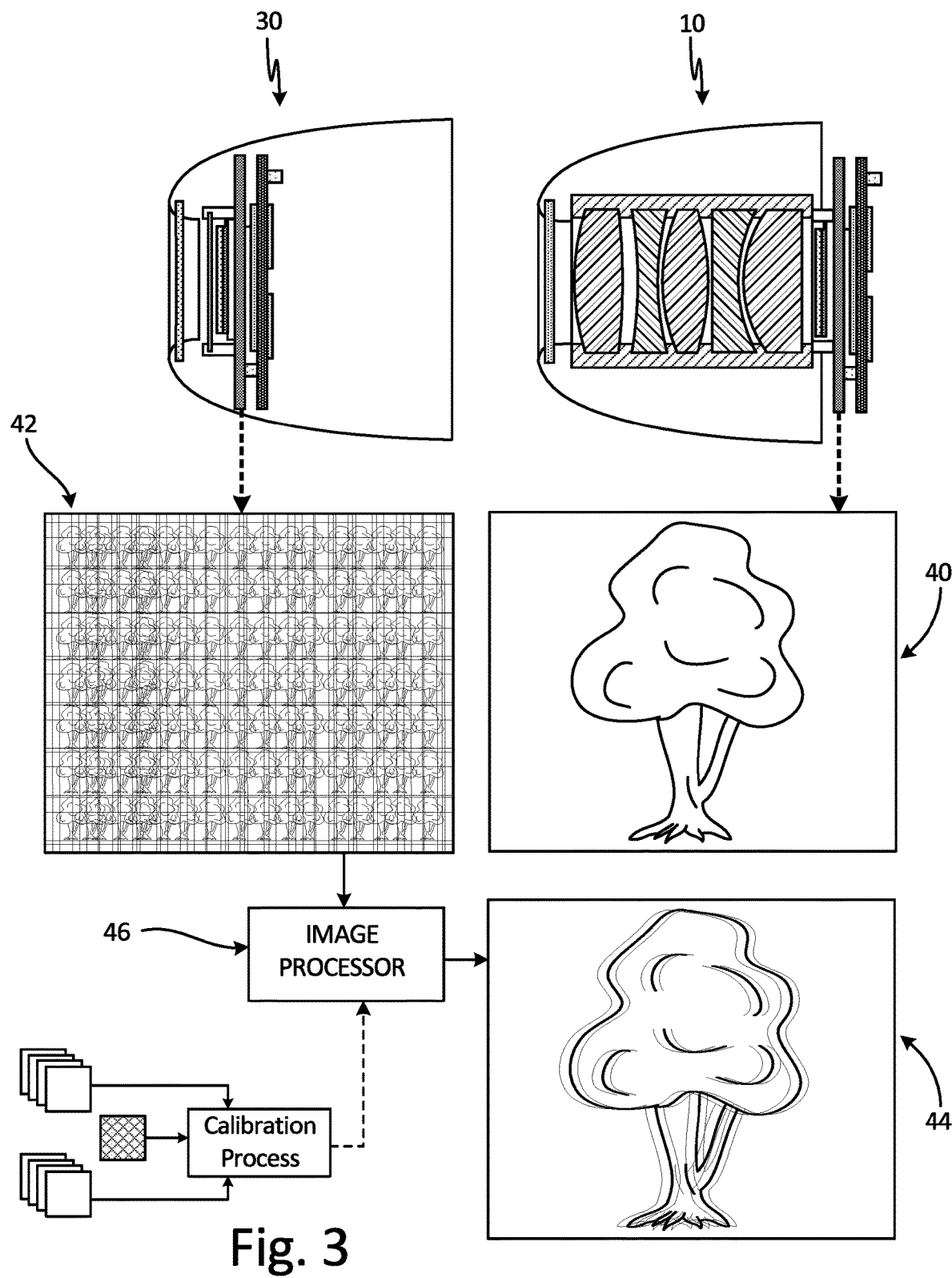
FIG. 3 is a schematic view depicting a method of reconstructing an image of a scene from raw super-imposed images created using a spatial light modulator.

FIG. 3 is a schematic view depicting a method of reconstructing an image of a scene from a raw super-imposed image created using a spatial light modulator. In FIG. 3, both terminal-imaging seekers 10 and 30 depicted in FIGS. 1A and 1B, respectively, are shown. Terminal-imaging seeker 10 produces raw image 40, which is not a multiplex of overlapping images, and therefore does not require reconstruction. Terminal-imaging seeker 30 produces raw super-imposed image 42, which is formed as an image containing multiple overlapping exposures of the scene.

Reconstructed image 44 is formed using a reconstruction algorithm that is known in the art. For example, DeWeert and Farm disclose one such reconstruction algorithm in "Lensless Coded-Aperture Imaging with Separable Doubly-Toeplitz Masks," *Opt. Eng.* 54(2), 023102 (Feb. 3, 2015). doi:10.1117/1.OE.54.2.023102, the entire disclosure of which is hereby incorporated by reference. Reconstruction of image 44 is based on the specific configuration of the plurality of apertures 34 created by spatial light modulator 32 and based on super-imposed image data 42. Reconstruction of image 44 can be performed, for example, by image processor 46.

Figure 4:
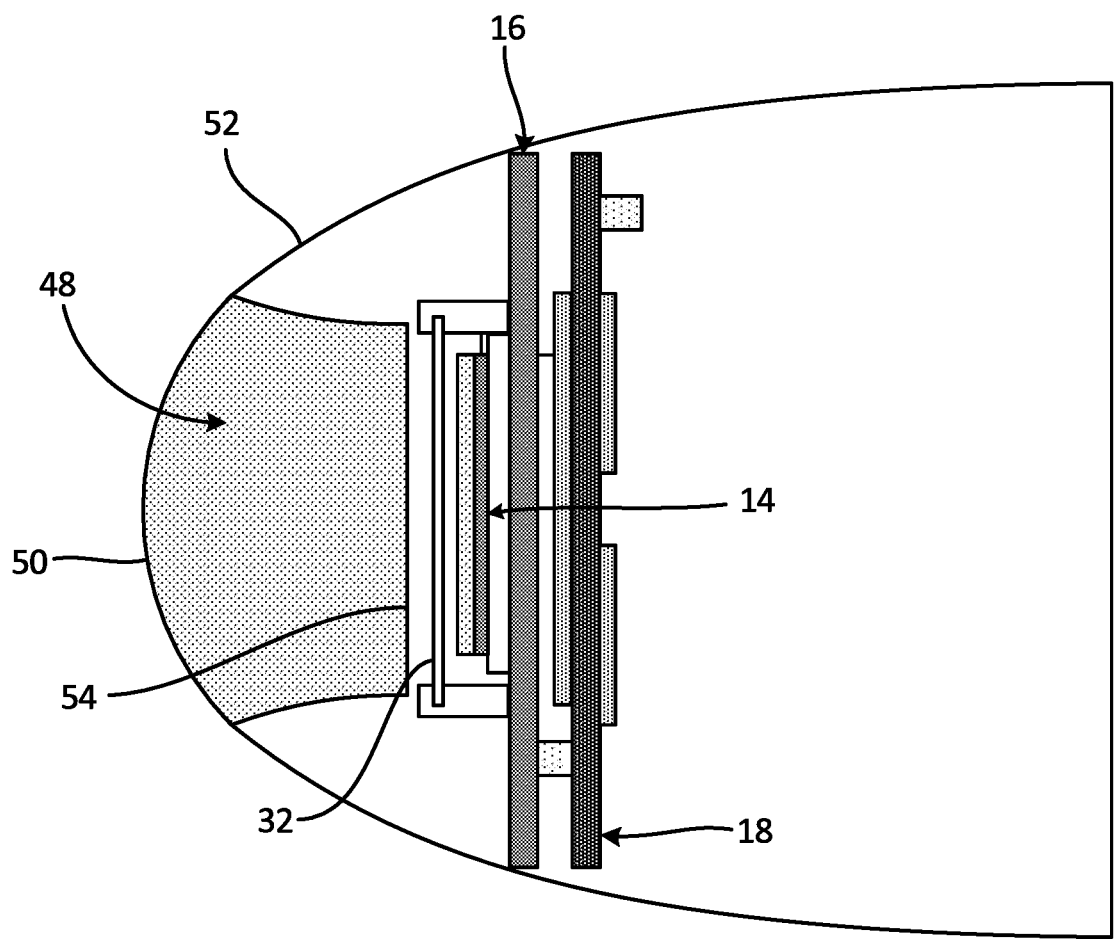
FIG. 4 is a cross-sectional view of a tapered nose cone of a munition having an optically-neutral lens that is conformal with the munition nose cone.

FIG. 4 is a cross-sectional view of a tapered nose cone of a munition having an optically-neutral lens or dome that is conformal with the munition nose cone. In FIG. 4, terminal-imaging seeker 30 depicted in FIG. 1B is reproduced, but instead of blunt window faceplate 22, includes optically-neutral lens 48. Optically-neutral lens 48 has front convex surface 50 which has a convex geometry that is conformal with nose cone 52. Optically-neutral lens 48 has a front convex surface 50 configured to provide a high ballistic coefficient. Optically-neutral lens 48 is configured to transmit light received by front convex surface 50 to rear planar surface 54, in an optically-neutral fashion.

Optical neutrality, as used in this context, means that images formed with and without optically-neutral lens by the imaging system, which includes spatial light modulator 32, and focal plane array 14, are substantially the same one to another. Such a condition results from an optically-neutral lens having no optical power. In the depicted embodiment, optical-neutrality can be obtained using a graded index (GRIN) material in optically-neutral lens. The refractive index of optically-neutral lens 48 is graded so as to transmit light from front convex surface 50 to rear planar surface 54 in an optically-neutral fashion (e.g., the transmitted light has the same phase and/or intensity relation at rear planar surface 54 with or without optically-neutral lens 48 in use). In various embodiments, various configurations of optically neutral lenses can be used. For example, the rear surface can be convex, concave or planar.

Figure 5:
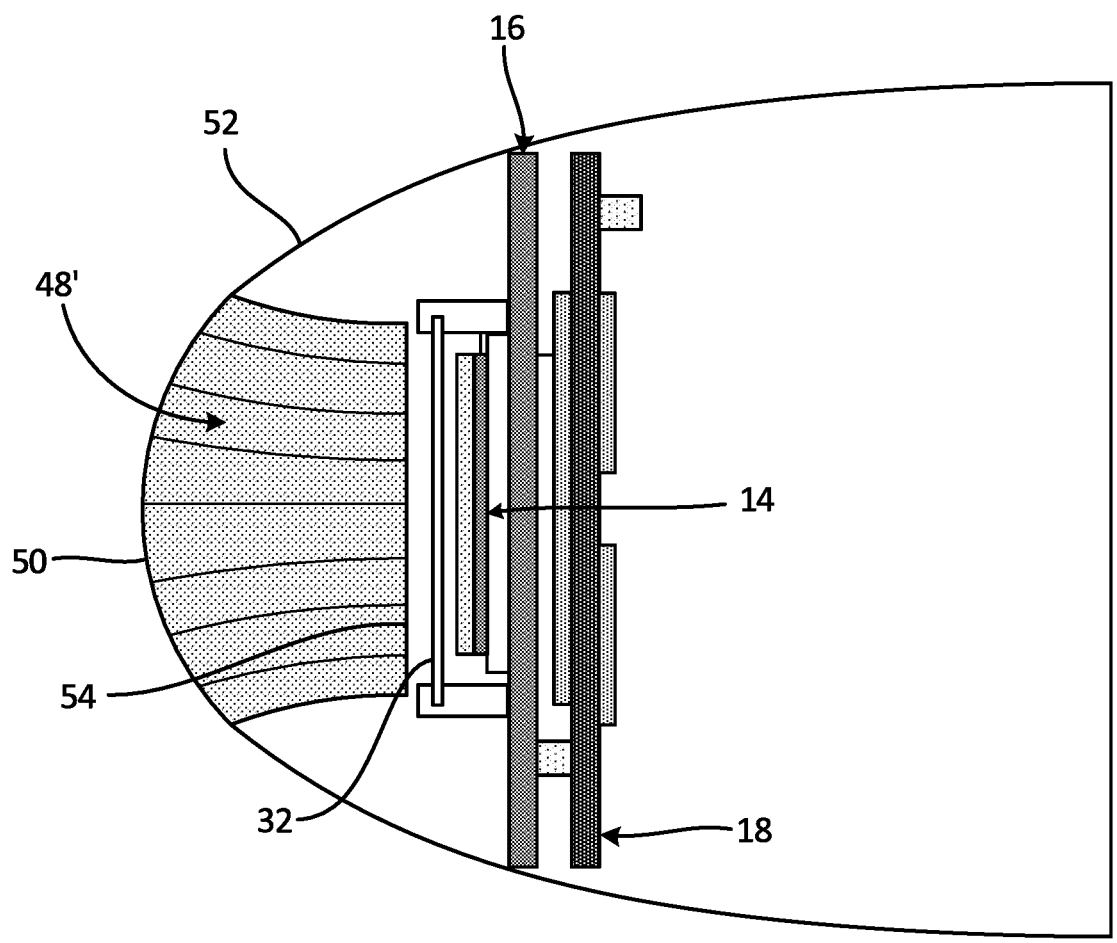
FIG. 5 is a cross-sectional view of a tapered nose cone of a munition having a tapered imaging fiber optic faceplate that is conformal with the munition nose cone.

FIG. 5 is a cross-sectional view of a tapered nose cone of a munition having a tapered imaging fiber optic faceplate that is conformal with the munition nose cone. Using such a fiber optic faceplate, the alignment of the spatial light modulator and focal plane array need not be axial with the munition. The fiber optics can be configured to direct the received light to the spatial light modulator and focal plane array, however they are aligned with the tapered nose cone. In FIG. 5, terminal-imaging seeker 30 depicted in FIG. 4 is reproduced, but instead of graded index lens 48, includes tapered-imaging fiber-optic lens 48'. Tapered-imaging fiber-optic lens 48' again has front convex surface 50 which has a convex geometry that is conformal with nose cone 52. And again, tapered-imaging fiber-optic lens 48' has a front convex surface 50 configured to provide a high ballistic coefficient. Tapered-imaging fiber-optic lens 48' is configured to transmit light received by front convex surface 50 to rear planar surface 54, in an optically-neutral fashion (e.g., by maintaining a spatial intensity relation at the two surfaces 50 and 54).

In another embodiment, a munition can be fitted with a standard glass lens. The standard glass lens can have an ogive shape on a leading surface and a flat rear planar surface. The standard glass lens need not be optically neutral. To correct for non-optical-neutrality, a planar meta-surface lens may be affixed between the flat rear planar surface of the standard glass lens and focal plane array 14.

Figure 6:
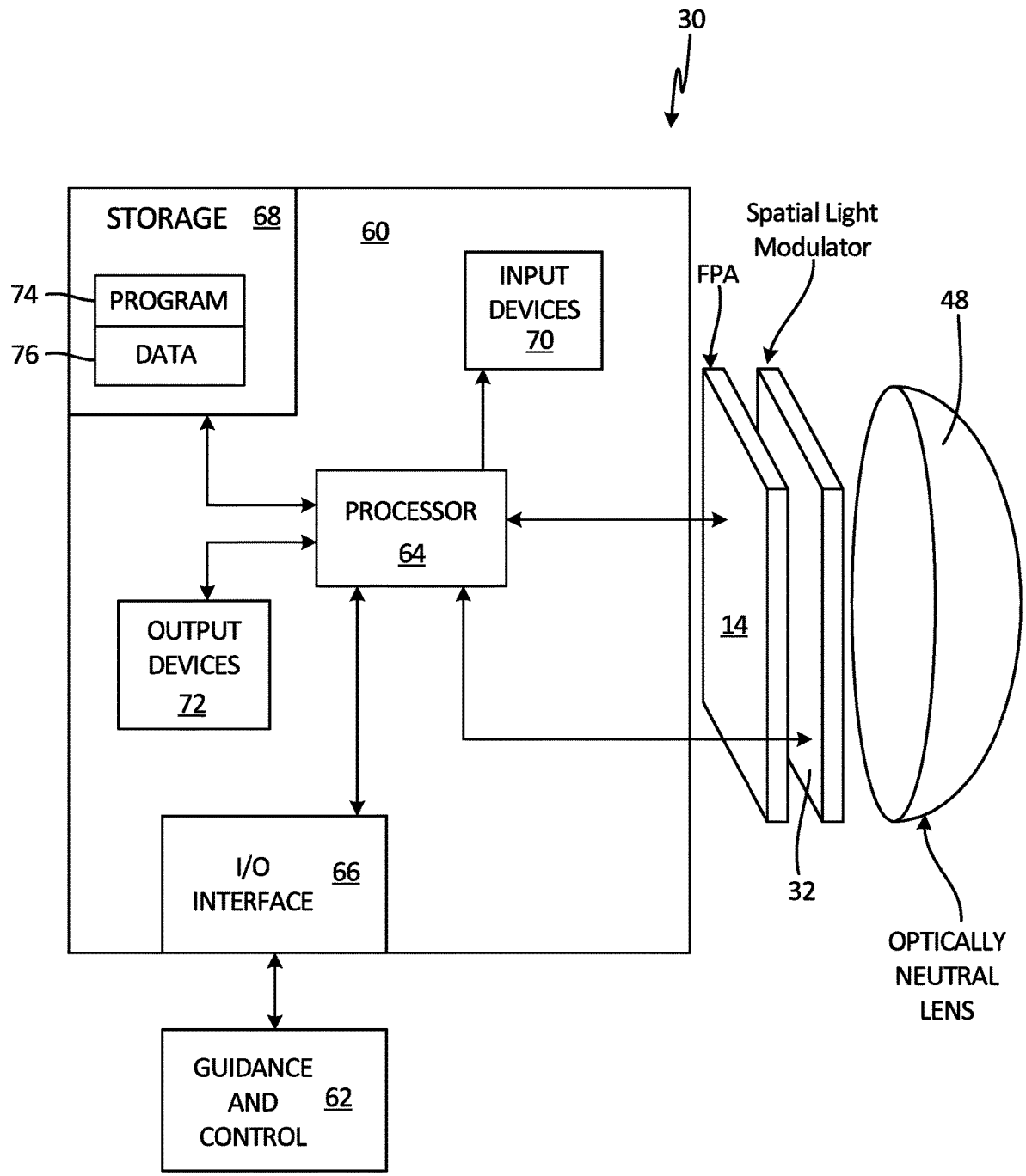
FIG. 6 is block diagram of an embodiment of a terminal-imaging seeker and munition guidance and control system.

FIG. 6 is block diagram of an embodiment of a terminal-imaging seeker and munition guidance and control system. In FIG. 6, terminal-imaging seeker 30 includes controller 60, spatial light modulator 32, and optically-neutral lens 48, Terminal-imaging seeker 30 is depicted interfacing with munition guidance and control system 62 of a munition. Controller 60 includes processor(s) 64, input/output interface 66, storage device(s) 68, input devices 70, output devices 72, and focal plane array 14. Storage device(s) 68 has various storage or memory locations. Storage device(s) 68 includes program memory 74, and data memory 76. Controller 60 is in communication with munition guidance and control system 62 via input/output interface 66. Munition guidance and control system 62 can provide controller 60 with metrics indicative of a munition location, orientation, speed, etc. Controller 60 can provide munition guidance and control system 62 with signals indicative of location of a target relative to the munition, for example.

As illustrated in FIG. 6, controller 60 includes processor(s) 64, input/output interface 66, storage device(s) 68, input devices 70, and output devices 72. However, in certain examples, controller 60 can include more or fewer components. For instance, in examples where controller 60 is an image processing system, controller 60 may not include input devices 70 and/or output devices 72. Controller 60 may include additional components such as a battery that provides power to components of controller 60 during operation, or additional sensors, etc. Controller 60 is shown in electrical communication with both focal plane array 14 and spatial light modulator 32. Controller 60 can be configured to generate a control signal that causes spatial light modulator 32 to generate a coded aperture mask pattern. Controller 60 can be configured to receive, from focal plane array 14, a signal indicative of an image of the scene as imaged through the coded aperture mask pattern generated in response to the control signal. Controller 60 can be configured to correct the image of the scene based on the signal received from focal plane array 14 and the specific coded aperture mask pattern corresponding to the signal received from focal plane array 14.

Processor(s) 64, in one example, is configured to implement functionality and/or process instructions for execution within controller 60. For instance, processor(s) 64 can be capable of processing instructions stored in storage device(s) 68. Examples of processor(s) 64 can include any one or more of a microprocessor, a controller, a digital signal processor (DSP), an application specific integrated circuit (ASIC), a field-programmable gate array (FPGA), or other equivalent discrete or integrated logic circuitry.

Input/output interface 66, in some examples, includes a communications module. Input/output interface 66, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the munition or with an external aircraft, ship, base, etc. can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Storage device(s) 68 can be configured to store information within controller 60 during operation. Storage device(s) 68, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 68 is a temporary memory, meaning that a primary purpose of Storage device(s) 68 is not long-term storage. Storage device(s) 68, in some examples, is described as volatile memory, meaning that storage device(s) 68 do not maintain stored contents when power to controller 60 is turned off. Examples of volatile memories can include random access memories (RAM), dynamic random access memories (DRAM), static random access memories (SRAM), and other forms of volatile memories. In some examples, storage device(s) 68 is used to store program instructions for execution by processor(s) 64. Storage device(s) 68, in one example, is used by software or applications running on controller 60 (e.g., a software program implementing long-range cloud conditions detection) to temporarily store information during program execution.

Storage device(s) 68, in some examples, also include one or more computer-readable storage media. Storage device(s) 68 can be configured to store larger amounts of information than volatile memory. Storage device(s) 68 can further be configured for long-term storage of information. In some examples, Storage device(s) 68 include non-volatile storage elements. Examples of such non-volatile storage elements can include magnetic hard discs, optical discs, flash memories, or forms of electrically programmable memories (EPROM) or electrically erasable and programmable (EEPROM) memories.

Although terminal-imaging seekers 30 are typically embedded systems, in some embodiments, terminal-imaging seekers 30 can include input devices 70. In some examples, input devices can be configured to receive input from a user, such as, for example, when in a configuration mode, and/or for calibration during manufacturing. Examples of input devices 70 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

Although terminal-imaging seekers 30 are typically embedded systems, in some embodiments, terminal-imaging seekers 330 can include output devices 72. Output devices can be configured to provide output to a user, such as, for example, during a configuration, and/or for calibration. Examples of output devices 72 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Figure 7:
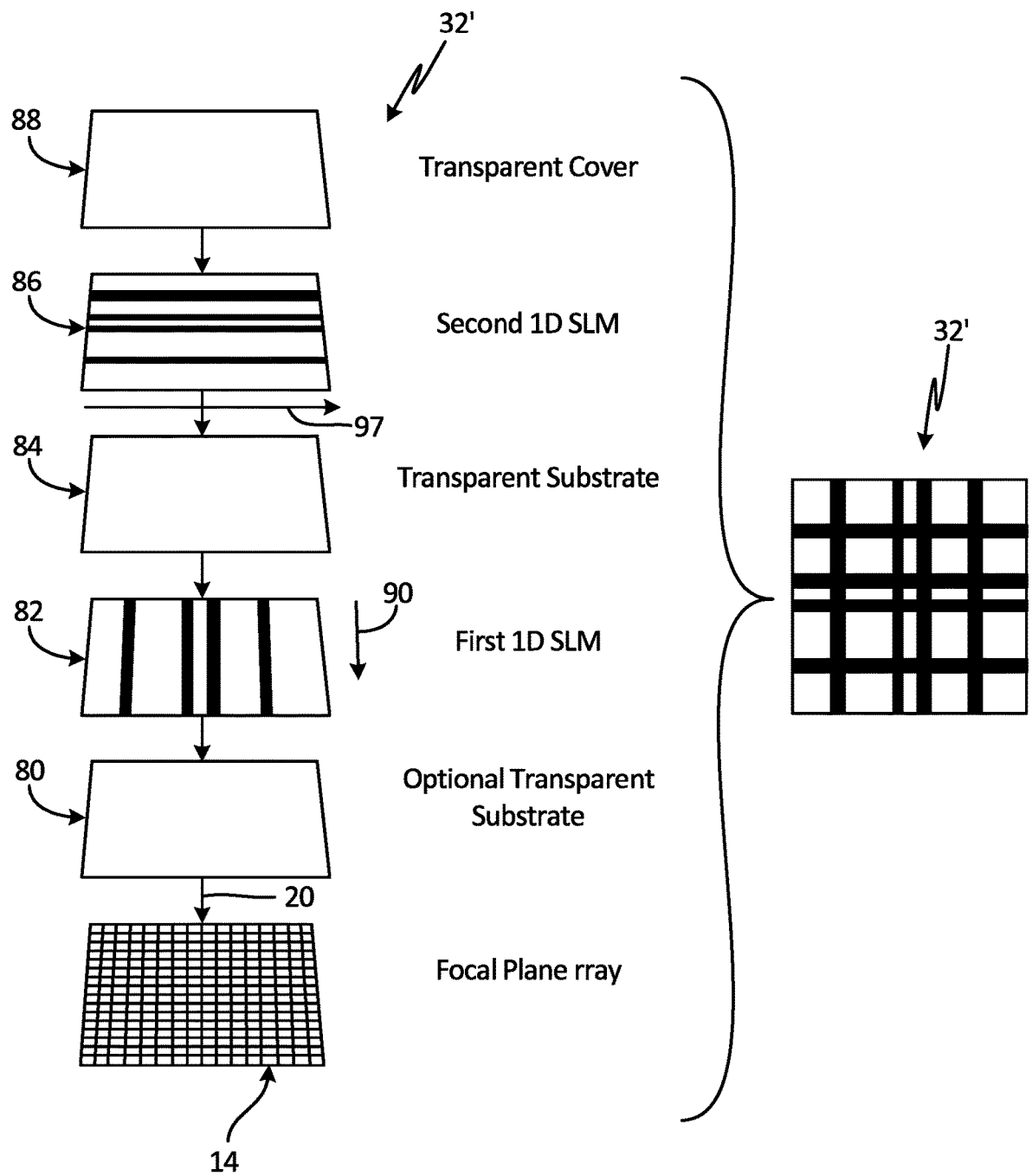
FIG. 7 is a diagram showing an embodiment of a one-dimensional (1D) spatial light modulator configured for use in a terminal-imaging seeker.

FIG. 7 is a diagram showing an embodiment of a spatial light modulator configured for use in a terminal-imaging seeker. In FIG. 7, spatial light modulator 32' is a spatial light modulator. Spatial light modulator 32' includes transparent substrate 80, first layer 82 of liquid-crystal elements, transparent interior layer 84, second layer 86 of liquid-crystal elements, and transparent cover 88. First layer 82 has liquid-crystal elements 82a, 82b, 82c, and 82d arranged in lines parallel to first transverse axis 90 and perpendicular to optical axis 20. Second layer 86 has liquid-crystal elements 86a, 86b, 86c, and 86d arranged in lines parallel to second transvers axis 92 and perpendicular to both optical axis 20 and first transverse axis 90. Such a linearly-patterned spatial light modulator 32' as depicted in FIG. 7 would limit the coded aperture mask patterns to those that can be separated into perpendicular one-dimensional arrays of linear patterns.

Spatial light modulator 32' can be created by utilizing reflective or absorptive liquid crystals placed in one-dimensional arrays across a transparent surface. One option for a thin application with minimal geometric blur could be to apply the liquid crystal to both sides of a single thin transparent substrate rather than on each of two separate substrates.

Also depicted in FIG. 7 is focal plane array 14. In some embodiments, spatial light modulator 32' can be manufactured directly upon focal plane array 14 so as to form a unitary device. In some embodiments Spatial light modulator 32' and focal plane array 14 can be separate devices. For example, temperatures associated with manufacturing processes or installation requirements can drive design of spatial light modulator 32' to be a separate part from the focal plane array 14. In some embodiments, spatial light modulator 32' could be installed onto focal plane array 14 using an optical adhesive.

Figure 8:
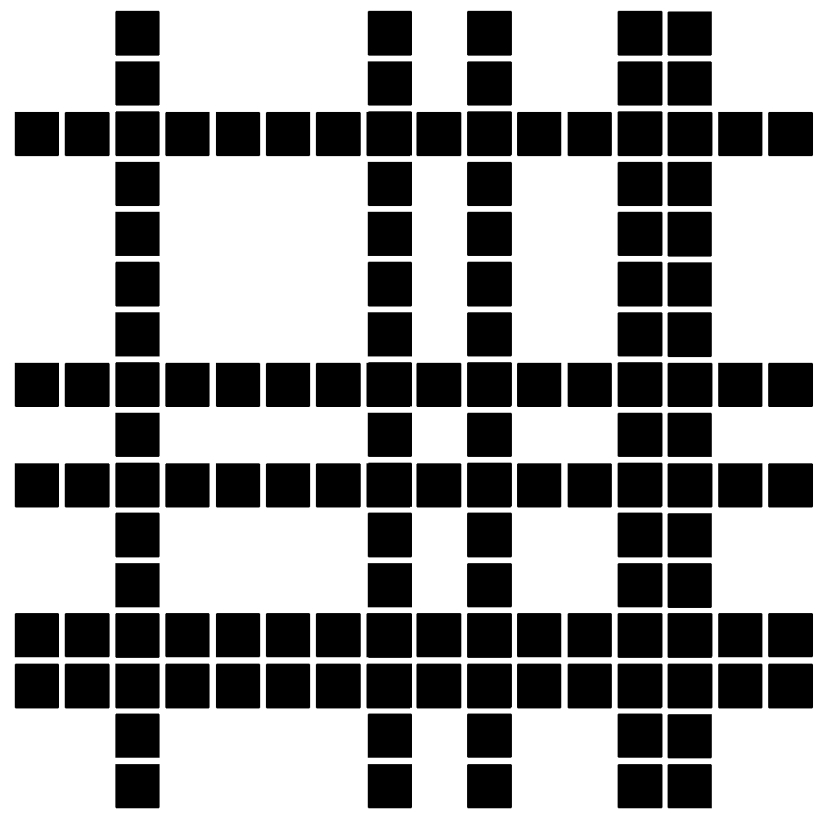
FIG. 8 is a diagram showing an embodiment of a two-dimensional (2D) spatial light modulator configured for use in a terminal-imaging seeker.

FIG. 8 is a diagram showing an embodiment of a spatial light modulator configured for use in a terminal-imaging seeker. In FIG. 8, spatial light modulator 32" is a spatial light modulator. Spatial light modulator 32" includes a two-dimensional array of pixels 32xy. The two-dimensional array can include liquid-crystal and/or mirror pixels 32xy. The two-dimensional array is perpendicular the optical axis and aligned with the rows and columns of pixels of the focal plane array. Pixels 32xy can have boundaries that are less than a minimum mask feature size (e.g., less than a half wavelength of light) so that the separations between pixels are not seen in the image on the sensor. Such a two-dimensional pixel array, as depicted in FIG. 8, can provide for more coded-aperture mask patterns than can be provided by perpendicular linear arrays, such as those depicted in the FIG. 7 embodiment. Liquid crystal and/or mirror materials can be designed for a specific energy or light wavelength sensed by the focal plane array. Coded aperture patterns can also be selected for specific wavelength optimization. Application of liquid crystals and/or mirrors can utilize vapor deposition, thin film methods or printing with liquid crystal inks.

Substrates and covers (e.g., transparent substrate 80 and transparent cover 88 depicted in FIG. 7) can be made of a variety of materials and thicknesses and produced by several manufacturing methods. Glasses, plastics, and transparent ceramics can be utilized in the construction of the substrates. Substrates and/or covers can be made out of a coating material deposited in various fashions. Traditional material processing and manufacturing techniques can be employed for these materials, but more exotic methods, like vapor deposition and 3D printing, can also be used for manufacture. Substrate thickness and material can be tailored to provide mechanical robustness. Plastics may provide more flexibility in the design and lighter weight, where ceramics may be used in higher temperature applications.

Support circuitry for spatial light modulator 32' and 32" can be either placed outside of the region where energy must pass therethrough so as to reach focal plane array 14 or such support circuitry can be made of materials that are transparent to the wavelength sensed by focal plane array 14. Such materials can include Indium Tin Oxide, for example.

Using spatial light modulator 32' and/or 32" instead of a static coded-aperture mask can permit programming of any desired coded pattern. A particular coded pattern might be well suited for a particular mission, CONOPS, or scene, a specific light intensity level, for example. A particular coded pattern might work well for a specific target or background within the scene. Spatial light modulator 32' and/or 32" can be programmed to generate well-suited coded patterns or to generate multiple patterns during a mission. In some scenarios, the coded patterns can change as a guided missile approaches its target, for example. Use of multiple coded patterns can permit exposures of the same scene using different coded-aperture masks so as to: i) reduce blur and other aberrations; ii) control light exposure of the scene; and/or iii) tune resolution of the corrected image of the scene.

Multiple exposures of the scene can be performed using the same coded pattern rotated at 90 degree increments or using completely different patterns, for example. The multiple images can be compared and combined into a single image for improved image reconstruction. An additional use of programming a particular pattern is that the SLM could be utilized to create a downsized physical window of the area of interest on the focal plane array. Perhaps to be used to aid in compressive sense.

DISCUSSION OF POSSIBLE EMBODIMENTS

The following are non-exclusive descriptions of possible embodiments of the present invention.

Apparatus and associated methods relate to a system for creating a corrected image of a scene for a terminal-imaging seeker. The system includes a lens, a focal plane array, a spatial light modulator, a controller, and an image processor. The lens is configured to receive light from a scene aligned with an optical axis. The focal plane array is aligned with the optical axis and has an imaging region comprising a plurality of light-sensitive pixels. The spatial light modulator is capable of generating a plurality of different coded-aperture mask patterns, each having a plurality of pinhole-like transparent apertures. The spatial light modulator includes a plurality of electrically-controllable elements, each configured to modulate light transmission therethrough in response to an electrical control signal. The spatial light modulator is aligned along the optical axis so as to transmit light through the plurality of pinhole-like transparent apertures onto the imaging region of the focal plane array thereby forming a raw super-imposed image of a corresponding plurality of overlapping images of the scene. The controller is configured to generate a first electrical control signal that causes the spatial light modulator to generate a first of the plurality of coded-aperture mask patterns. The image processor is configured to create, based on an algorithm corresponding to the first of the plurality of coded-aperture mask pattern and on a first raw super-imposed image, the corrected image of the scene.

The system of the preceding paragraph can optionally include, additionally and/or alternatively, any one or more of the following features, configurations and/or additional components:

A further embodiment of the foregoing system, wherein the spatial light modulator can include a plurality of liquid-crystal elements.

A further embodiment of any of the foregoing systems, wherein the spatial light modulator can include two layers of liquid-crystal elements, the first layer configured to controllably modulate light transmission in parallel lines perpendicular to the optical axis, the second layer configured to controllably modulate light transmission in parallel lines perpendicular to both the optical axis and the parallel lines of the first layer.

A further embodiment of any of the foregoing systems, wherein the spatial light modulator can include a two-dimensional array of liquid-crystal pixel elements, the two-dimensional array perpendicular to the optical axis.

A further embodiment of any of the foregoing systems, wherein the controller can be further configured to generate a second electrical control signal that causes the spatial light modulator to generate a second of the plurality of coded-aperture mask patterns.

A further embodiment of any of the foregoing systems, wherein the second of the plurality of coded-aperture mask pattern can be selected based on the first raw super-imposed image.

A further embodiment of any of the foregoing systems, wherein sizes of at least some of the plurality of pinhole-like transparent apertures of the second of the plurality of coded-aperture mask pattern can be selected based on a light amplitude level of the first raw super-imposed image.

A further embodiment of any of the foregoing systems, wherein sizes of at least some of the plurality of pinhole-like transparent apertures of the second of the plurality of coded-aperture mask pattern can be selected based on a wavelength of light to which the focal point array is sensitive.

A further embodiment of any of the foregoing systems, wherein the second of the plurality of coded-aperture mask pattern can include a rotated portion of the first of the plurality of coded-aperture mask pattern.

A further embodiment of any of the foregoing systems, wherein the image processor can be further configured to create, based on an algorithm corresponding to the second of the plurality of coded-aperture mask patterns and on a second raw super-imposed image, the corrected image.

A further embodiment of any of the foregoing systems, wherein the image processor can be further configured to create the corrected image based on both the first and second raw super-imposed images.

A further embodiment of any of the foregoing systems, wherein the first of the plurality of coded-aperture mask patterns can be one of Uniformly Redundant Array (URA), Modified Uniformly Redundant Array (MURA), Maximum Length Sequence (MLS), and Doubly Toeplitz mask patterns.

A further embodiment of any of the foregoing systems, wherein the lens can be an optically-neutral lens aligned along the optical axis and having a front convex surface and a back planar surface. The front convex surface can be configured to provide low aerodynamic drag when engaging air at a leading edge of the terminal-imaging seeker. The optically-neutral lens can be configured to receive light from the scene aligned along the optical axis and configured to transmit light from the scene received at the front convex surface to the back planar surface in an optically-neutral fashion.

Some embodiments relate to a method for creating a corrected image of a scene for a terminal-imaging seeker. The method includes receiving, via a lens, light from a scene aligned along an optical axis. The method includes generating, via a controller, a first electrical control signal corresponding to a first of a plurality of coded-aperture mask patterns. The method includes generating, via a plurality of electrically-controllable elements of a spatial light modulator, the first of a plurality of coded-aperture mask pattern in response to the first electrical control signal generated by the controller. The first of a plurality of coded-aperture mask pattern has a plurality of pinhole-like transparent apertures. The method includes transmitting a portion of the light received by the lens through the plurality of pinhole-like apertures of the first of a plurality of coded-aperture mask pattern. The method includes projecting the portion of the light received by the lens and transmitted through the plurality of pinhole-like apertures onto a focal plane array aligned with the optical axis so as to form a first raw super-imposed image of a corresponding plurality of overlapping images of the scene. The method also includes creating, via an image processor, the corrected image of the scene based on an algorithm corresponding to the first of a plurality of coded-aperture mask pattern and on the first raw super-imposed image.

The method of the preceding paragraph can optionally include, additionally and/or alternatively, any one or more of the following features, configurations and/or additional components:

A further embodiment of the foregoing method, wherein forming the plurality of pinhole-like apertures can include controllably modulating light transmission though a first layer in parallel lines perpendicular to the optical axis. Forming the plurality of pinhole-like apertures can further include controllably modulating light transmission through a second layer in parallel lines perpendicular to both the optical axis and the parallel lines of the first layer.

A further embodiment of any of the foregoing methods can further include generating, via the controller, a second electrical control signal corresponding to a second of a plurality of coded-aperture mask patterns.

A further embodiment of any of the foregoing methods can further include creating, via the image processor, the corrected image of the scene based on an algorithm corresponding to the second of a plurality of coded-aperture mask pattern and on the second raw super-imposed image.

A further embodiment of any of the foregoing methods can further include selecting sizes of at least some of the plurality of pinhole-like transparent apertures of the second of the plurality of coded-aperture mask pattern based on a light amplitude level of the first raw super-imposed image.

A further embodiment of any of the foregoing methods can further include selecting sizes of at least some of the plurality of pinhole-like transparent apertures of the second of the plurality of coded-aperture mask pattern based on a wavelength of light to which the focal point array is sensitive.

A further embodiment of any of the foregoing methods can further include receiving, at a front convex surface of the lens, the light from the scene aligned along the optical axis. The embodiment can further include transmitting, to a rear planar surface of the lens, the light received at the front convex surface of the lens in an optically-neutral fashion.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for creating a corrected image of a scene for a terminal-imaging seeker, the system comprising:
    a lens configured to receive light from a scene aligned with an optical axis;
    a focal plane array aligned with the optical axis and having an imaging region comprising a plurality of light-sensitive pixels;
    a spatial light modulator capable of generating a plurality of different coded-aperture mask patterns, each having a plurality of pinhole-like transparent apertures, the spatial light modulator comprising a plurality of electrically-controllable elements, each configured to modulate light transmission therethrough in response to an electrical control signal, the spatial light modulator aligned along the optical axis so as to transmit light through the plurality of pinhole-like transparent apertures onto the imaging region of the focal plane array thereby forming a raw super-imposed image of a corresponding plurality of overlapping images of the scene;
    a controller configured to generate a first electrical control signal that causes the spatial light modulator to generate a first of the plurality of coded-aperture mask patterns; and
    an image processor configured to create, based on an algorithm corresponding to the first of the plurality of coded-aperture mask pattern and on a first raw super-imposed image, the corrected image of the scene.

2. The system of claim 1, wherein the spatial light modulator comprises a plurality of liquid-crystal elements.

3. The system of claim 2, wherein the spatial light modulator comprises two layers of liquid-crystal elements, the first layer configured to controllably modulate light transmission in parallel lines perpendicular to the optical axis, the second layer configured to controllably modulate light transmission in parallel lines perpendicular to both the optical axis and the parallel lines of the first layer.

4. The system of claim 2, wherein the spatial light modulator comprises a two-dimensional array of liquid-crystal pixel elements, the two-dimensional array perpendicular to the optical axis.

5. The system of claim 1, wherein the controller is further configured to generate a second electrical control signal that causes the spatial light modulator to generate a second of the plurality of coded-aperture mask patterns.

6. The system of claim 5, wherein the second of the plurality of coded-aperture mask pattern is selected based on the first raw super-imposed image.

7. The system of claim 6, wherein sizes of at least some of the plurality of pinhole-like transparent apertures of the second of the plurality of coded-aperture mask pattern are selected based on a light amplitude level of the first raw super-imposed image.

8. The system of claim 5, wherein sizes of at least some of the plurality of pinhole-like transparent apertures of the second of the plurality of coded-aperture mask pattern are selected based on a wavelength of light to which the focal point array is sensitive.

9. The system of claim 5, wherein the second of the plurality of coded-aperture mask pattern includes a rotated portion of the first of the plurality of coded-aperture mask pattern.

10. The system of claim 5, wherein the image processor is further configured to create, based on an algorithm corresponding to the second of the plurality of coded-aperture mask patterns and on a second raw super-imposed image, the corrected image.

11. The system of claim 10, wherein the image processor is further configured to create the corrected image based on both the first and second raw super-imposed images.

12. The system of claim 1, wherein the first of the plurality of coded-aperture mask patterns is one of Uniformly Redundant Array (URA), Modified Uniformly Redundant Array (MURA), Maximum Length Sequence (MLS), and Doubly Toeplitz mask patterns.

13. The system of claim 1, wherein the lens is an optically-neutral lens aligned along the optical axis and having a front convex surface and a back planar surface, the front convex surface configured to provide low aerodynamic drag when engaging air at a leading edge of the terminal-imaging seeker, the optically-neutral lens configured to receive light from the scene aligned along the optical axis and configured to transmit light from the scene received at the front convex surface to the back planar surface in an optically-neutral fashion.

14. A method for creating a corrected image of a scene for a terminal-imaging seeker, the method comprising:
    receiving, via a lens, light from a scene aligned along an optical axis;
    generating, via a controller, a first electrical control signal corresponding to a first of a plurality of coded-aperture mask patterns;
    generating, via a plurality of electrically-controllable elements of a spatial light modulator, the first of a plurality of coded-aperture mask pattern in response to the first electrical control signal generated by the controller, the first of a plurality of coded-aperture mask pattern having a plurality of pinhole-like transparent apertures;
    transmitting a portion of the light received by the lens through the plurality of pinhole-like apertures of the first of a plurality of coded-aperture mask pattern;
    projecting the portion of the light received by the lens and transmitted through the plurality of pinhole-like apertures onto a focal plane array aligned with the optical axis so as to form a first raw super-imposed image of a corresponding plurality of overlapping images of the scene; and
    creating, via an image processor, the corrected image of the scene based on an algorithm corresponding to the first of a plurality of coded-aperture mask pattern and on the first raw super-imposed image.

15. The method of claim 14, wherein forming the plurality of pinhole-like apertures includes:
    controllably modulating light transmission though a first layer in parallel lines perpendicular to the optical axis; and
    controllably modulating light transmission through a second layer in parallel lines perpendicular to both the optical axis and the parallel lines of the first layer.

16. The method of claim 14, further comprising:
    generating, via the controller, a second electrical control signal corresponding to a second of a plurality of coded-aperture mask patterns.

17. The method of claim 16, further comprising:
    creating, via the image processor, the corrected image of the scene based on an algorithm corresponding to the second of a plurality of coded-aperture mask pattern and on the second raw super-imposed image.

18. The method of claim 14, further comprising:
    selecting sizes of at least some of the plurality of pinhole-like transparent apertures of the second of the plurality of coded-aperture mask pattern based on a light amplitude level of the first raw super-imposed image.

19. The method of claim 14, further comprising:
selecting sizes of at least some of the plurality of pinhole-like transparent apertures of the second of the plurality of coded-aperture mask pattern based on a wavelength of light to which the focal point array is sensitive.

20. The method of claim 14, further comprising:
receiving, at a front convex surface of the lens, the light from the scene aligned along the optical axis; and
transmitting, to a rear planar surface of the lens, the light received at the front convex surface of the lens in an optically-neutral fashion.

\* \* \* \* \*